United States Patent [19]

Hughes, Jr.

[11] 4,035,095

[45] July 12, 1977

[54] SPLIT ATTACHMENT

[75] Inventor: Thomas J. Hughes, Jr., Northbrook, Ill.

[73] Assignee: EF & EF Industries, Inc., Hillside, Ill.

[21] Appl. No.: 605,750

[22] Filed: Aug. 18, 1975

[51] Int. Cl.² .......................................... B25G 3/00
[52] U.S. Cl. ............................... 403/282; 403/285; 59/85; 403/340
[58] Field of Search .......... 403/282, 285, 206, 311, 403/216, 344, 218, 364, 274, 396, 340, 405, 206, 216, 274; 46/17; 59/82, 85

[56] References Cited

U.S. PATENT DOCUMENTS

| | | | |
|---|---|---|---|
| 612,501 | 10/1898 | Klatte | 59/85 UX |
| 3,256,578 | 6/1966 | Luketa | 403/405 |
| 3,834,549 | 9/1974 | Burg | 403/218 X |

Primary Examiner—Wayne L. Shedd
Attorney, Agent, or Firm—Fitch, Even, Tabin & Luedeka

[57] ABSTRACT

A split attachment is provided from two substantially identical half pieces each having projections and slots adapted for wedgedly joining the respective halves together for securing tightly about an article. Means on the split half pieces may be deformed against the surfaces of the article to prevent sliding of the attachment or a loose movement between the gripped articles when the attachment is used to join two articles together such as the rods of a brass bed headboard.

4 Claims, 4 Drawing Figures

U.S. Patent   July 12, 1977   4,035,095
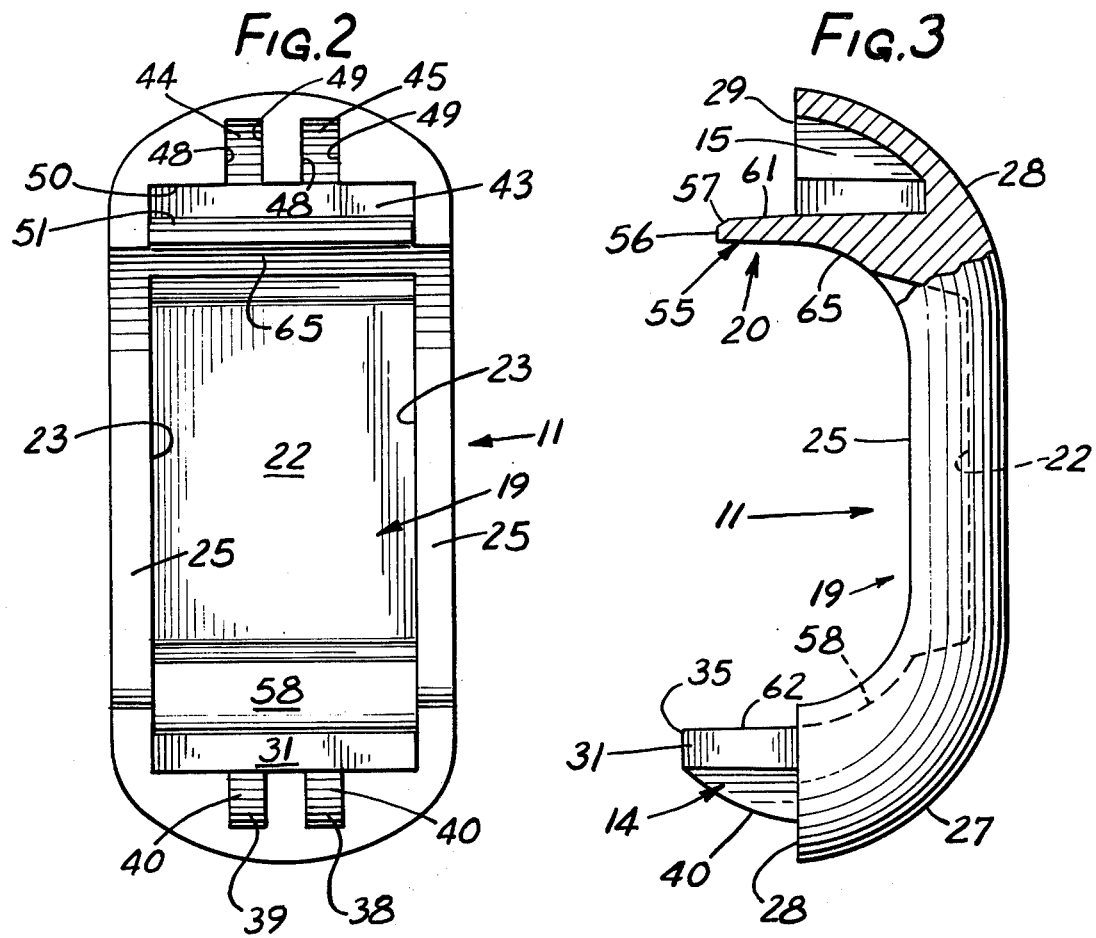
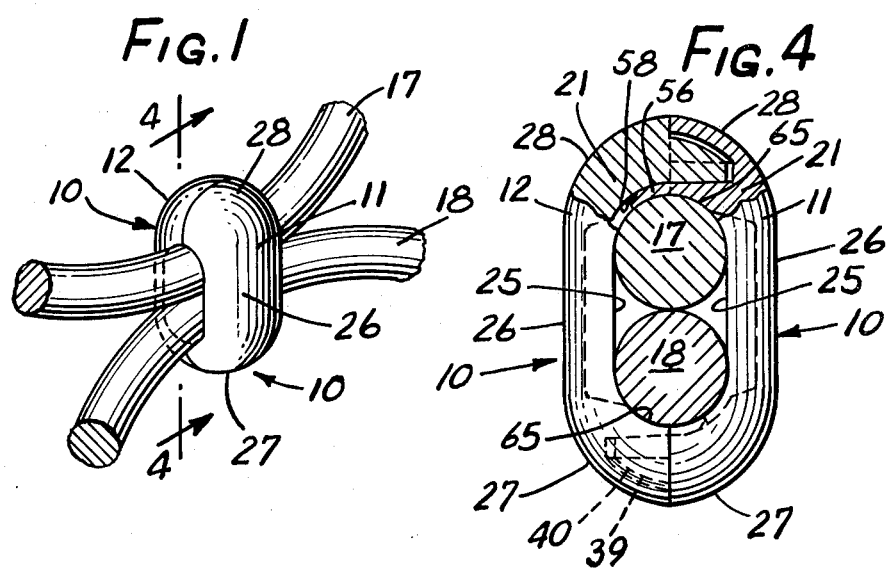

SPLIT ATTACHMENT

This invention relates to split attachments which are secured to one or more articles or objects.

The present invention is directed to a split attachment which may be only part of a decorative scheme and, in such case, appearance is very important, and the split attachment also may be used functionally for securing together two or more articles. For instance, the illustrated split attachment may be used to secure together several rods forming a brass headboard and also to provide a decorative appearance to these rods as though the attachment were integral therewith. While it may be possible to secure such split attachments by welding or adhesives to such rods, this is not satisfactory from a cost and decorative standpoint. Such split attachments should be low-cost, attractive and readily assembled on the rod, and they also should withstand vibration and abuse during shipping, assembling and later use without separating or sliding along the rods.

Accordingly, an object of this invention is to provide a new and improved split attachment of the foregoing kind.

Another object of this invention is to provide an attachment device that can be adequately secured about the attached articles.

A further object of this invention is to provide an attachment that has aesthetic appeal when used to join rods of a brass bed headboard.

These and other objects of the invention are more particularly set forth in the following description and in the accompanying drawings of which:

FIG. 1 is a perspective view of a split attachment secured about two rods.

FIG. 2 is an elevational view of the front or interior of one-half of a split attachment.

FIG. 3 is a side view, partially in section, of one-half of a split attachment.

FIG. 4 is a sectional view along line 4—4 with a partial sectional view of an attachment.

As shown in the drawings for the purposes of illustration, the invention is exemplified in a split attachment 10 comprised of two half pieces 11 and 12 which are identical in shape and are formed with mating projections 14 and slots 15 for interlocking the half pieces together and to secure them to and about an object such as one or more rods 17 and 18. Herein, the rods 17 and 18 are brass headboard rods for a brass bed and approximately 14 to 16 split attachments 10 are used to fasten together the various rods comprising each headboard. Thus, the illustrated attachments 10 perform a decorative and a functional purpose when clamping the rods 17 and 18 together on a headboard.

It is particularly important that the attachments 10 not only remain interlocked to hold the rods 17 and 18 in place, but also do not slip or slide or vibrate loose when the headboards are shipped long distances and subjected to prolonged periods of vibrations during shipping.

In accordance with the present invention, the half pieces 11 and 12 are securely fastened to each other by wedging engagement of the protrusions 14 on one piece into slots 15 on the other piece and are also forced together to frictionally and compressively grip the rods 17 and 18. Preferably, a deformable means is provided on each half piece and it is forced to bend inwardly about the article when the half pieces are joined together about the article.

In the preferred embodiment of this invention, each half piece 11 and 12 is constructed of die cast zinc body 21 and roughly in the form of an oval or C-shaped configuration, although other shapes such as circular may be used. To save on metal costs, an interior center hollow section 19 of each body 21 is recessed and hollowed and is defined by an inner wall 22 joined to a pair of inner side walls 23. The side walls 23 terminate in edge walls 25 which tightly abut the rods 17 and 18 as seen in FIG. 4 and lock them securely together.

Herein, the outer surface 26 of each half piece is substantially continuous and smooth, having rounded corners or shoulders 27 and 28 at opposite ends thereof. When the two halves are joined together, the outer surface of the whole attachment has somewhat the same appearance as that of a smooth, rounded oval body. To provide a one-piece appearance for the attachment, the parting line may be filled in or coated with a paint to provide a smooth outer, continuous surface for the attachment.

To accommodate the projections 14 and the slot 15 and to provide sufficient mechanical strength, it is preferred that each of the end portions of the half pieces is substantially thicker in cross section that its central hollow section 19. Herein, each end of the pieces 11 and 12 is formed flat, abutting surfaces 28 and 29 with the surface 28 of one half piece abutting the surface 29 of the other half piece when the pieces are secured together. The abutted end surfaces 28, 29 define a parting plane which bisects the complete split attachment and bisects the rods 17 and 18, as best seen in FIG. 4.

The projections 14 are preferably in the form of a central flat plate 31 which projects outwardly of the plane of the flat end surface 29. The plate 31 tapers to facilitate its insertion into its associated receiving slot 15, that is, the thickness of the plate decreases lightly from its inner end to its free end 35. The corners of this plate are also slightly rounded to facilitate insertion into the designated slot 15.

For the purpose of reinforcing the plate 31 and providing additional interlocking, the projection 14 further includes a pair of flat, parallel buttresses 38 and 39 spaced apart and disposed perpendicularly to the plate 31. The buttresses extend from the end surface 28 to the free ends 35 of the plates 31 and have outer curved walls 40. Herein, the buttresses are approximately the same thickness as the plate 31, viz., a nominal 0.0625 inch. In addition to reinforcing the plate-like projections, the buttressing projections 38 and 39 also serve as part of the compressive wedge joint of the half pieces for interlocking the pieces together.

The slots 15 for receiving the plate 31 and the buttresses 38 and 39 are located in the other ends of the pieces and include an elongated central recess 43 for receiving the plate 31 and a pair of intersecting recesses 44 and 45 for receiving the buttresses 38 and 39.

To assure a wedged joinder of the two halves 11 and 12, the slots 15 in the preferred embodiment are smaller than the projections 14 with the metal of the projections being deformed and wedged into tight engagement with the walls of the slots 15. More specifically, the width of each recess 44 and 45 between opposite side walls 48 and 49 is, in this example, 0.600 inch, whereas the width of each buttress is 0.625 inch. Likewise, the thickness of the plate recess between side walls 50 and 51 is 0.600 inch, whereas the width of the plate 31 is larger at 0.625 inch. Herein, the two half pieces are joined together by an air hammer operation which forces the wider and thicker projections 14 of one part into the smaller corresponding slots 15 of the other part, wedging them together. This provides a secure attachment without any external structures or defects which would clutter the appearance and detract from aesthetic appeal.

For the purpose of tightly gripping the rods 17 and 18 to prevent the rattling or sliding of the attachments 10 therealong, the means 20 for the attachment pieces 11 and 12 comprises deformable portions 55 in the form of plates 56 which are bent about and forced into intimate contact with the rods 17 and 18 during the assembly of the pieces. In this instance, the plate 56 is substantially straight and projects generally perpendicular to the end surface 29, as best seen in FIG. 3, until it is cammed and deflected by a curved wall 58 on the other piece to bend about the adjacent surface of the rod 17 or 18 and to be compressed tightly thereagainst.

As illustrated herein, this gripping plate 56 is generally rectangularly shaped and approximately 0.432 inches wide, 0.045 inches thick, and extends about 0.025 inches outward from the end surface 29. The thickness of this extension also tapers slightly, and a corner 57 of the extending edge is beveled at a 30° angle with the surface of the plate to facilitate bending of the plate by the curved surface 58.

When interlocking the two pieces 11 and 12 with an air hammer, the beveled edge 57 of each deformable plate 56 contacts an inwardly sloping curved surface 58 on the other piece. The power of the air hammer compression forces the bendable plate 56 to conform to the surface 58 and to be bent about an adjacent rod 17 or 18. As best seen in FIG. 4, an interior surface area 65 immediately adjacent the deformable plate 56 is curved to substantially the same radius of the rod 17 or 18 and will abut the surface thereof when the deformable plates 61 are bent to compressively and frictionally grip the rods.

When the split attachment 10 is coupled about two round metal rods 17 and, each of about 0.375 in diameter, as illustrated herein, the total length of the recess is roughly twice the diameter of each rod, or about 0.756 inches. The inwardly sloped surfaces 65 continue until they reach a depth of about one-half the diameter of the rods where they blend into the side walls 25 on the pieces. In this manner, each half of the split attachment is positioned half way about the two rods 17 and 18 and the plane in which the two end surfaces 28 and 29 lie passes through a center point of each rod within the attachment.

The attached rods 17 and 18 are not necessarily parallel at the point of attachment. For purposes of reducing fabrication costs, the recessed portion of each half piece, as presently embodied, is thinner than the end portions. The inner surface 22 of the recessed portion is concave and generally follows the contour of the outer surface 26 which is a smooth outer surface and provides the appearance of depth, but without requiring all the material that would be needed if it were solid.

The juncture between the surfaces 28 and 29 may be ground along the outer surfaces to provide a smoother appearance. Any gap or slit at the juncture may be filled or covered with paint, such as a brass paint, to conceal the juncture line.

Thus, it can be seen that with this mechanism, a simple attachment is provided which is easily constructed from two identical half pieces and provides a secure attachment without exterior structures or deformations to impair the appearance.

The preferred shape is particularly suit for die casting with zinc or other die castable metals. The use of identical half pieces also allows the inventory of pieces to be minimized. It is possible to die cast simultaneously an entire set of half pieces in a single operation and then to merely knock off the half pieces from the gate metal to provide a very low cost atttachment piece.

This invention has been described in terms of its present or preferred embodiment, but this does not impliedly exclude obvious or equivalent variations. For example, as presently embodied, this device is die cast of zinc, however the same invention may be embodied in attachments made of other suitable materials such as plastics. In addition, the outer configuration of the attachment may be annular or circular and the attachment may be secured to a single straight rod or piece such as a lamp base or pole. That is, the dimensions and shapes may necessarily vary, depending on the particular article or object to be attached.

Various other features of the invention are set forth in the following claims.

I claim:

1. A split attachment with a substantially continuous outer surface defined by two joined half pieces for tightly securing the attachment to an article, said half pieces being substantially identical, each of said half pieces having first and second end surfaces, the first end surface of each half piece abutting the second end surface of the other half piece when said half pieces are joined together about the article, a central recessed wall between said end surfaces for disposition about the article to be attached, a plate-like projection extending outwardly from said first surface, walls defining a recess in each of said second surfaces, said recesses being slightly smaller in size than at least one dimension of said plate-like projection for deforming the material of said plate-like projections and for wedgedly receiving and securing with the plate-like projection of the other one of said half pieces, a buttressing projection extending outwardly from said first end surface and being perpendicularly attached to said flat, plate-like projection to add strength thereto, and receiving recesses formed in said second end surface of slightly smaller cross-sectional area than said buttressing projection for deforming the material of the same and for wedgedly receiving and securing the latter therein.

2. In a brass bed headboard, the combination of two headboard rods having a predetermined point of attachment, a split attachment disposed about said rods at said point of attachment, said split attachment comprised of two substantially identical half pieces each having first and second end surfaces, a central surface for disposition about said rods, a plate-like projection extending from said first surface, and means defining a slot in said second surface having at least one dimension smaller than that of said plate-like projection for wedging the plate-like projection of one of said half pieces into the slot of the other of said half pieces which is oppositely positioned about said rods thus securing said attachment about said rods, and a deformable plate on each of said half pieces extending from the portion of said second surface for engaging a portion of the other half piece and for being forced inwardly to grip compressively one of said rods when said identical halves are wedged together.

3. A headboard in accordance with Claim 2 in which said split attachments are formed of a malleable die cast metal.

4. A split attachment with a substantially continuous outer surface defined by two joined half pieces for tightly securing the attachment to an article, said half pieces being substantially identical, each of said half pieces having first and second end surfaces, the first end surface of each half piece abutting the second end surface of the other half piece when said half pieces are joined together about the article, a central recessed wall between said end surfaces for disposition about the article to be attached, a plate-like projection extending outwardly from said first surface, walls defining a recess in each of said second surfaces, said recesses being slightly smaller in size than at least one dimension of said plate-like projection for wedgedly receiving and securing with the plate-like projection of the other one of said half pieces, and a deformable gripping portion extending from said second surface for engaging a portion of said other half piece for camming and forcing inwardly said deformable gripping portion into compressively gripping relationship to said article when said identical halves are wedged together.

* * * * *